(12) United States Patent
Stojanovski et al.

(10) Patent No.: US 11,632,734 B2
(45) Date of Patent: Apr. 18, 2023

(54) USE OF USER EQUIPMENT (UE) IDENTIFIERS FOR REGISTRATION IN FIFTH GENERATION (5G) SYSTEMS

(71) Applicant: APPLE INC., Cupertino, CA (US)

(72) Inventors: Alexandre Saso Stojanovski, Paris (FR); Robert Zaus, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/268,346

(22) PCT Filed: Aug. 12, 2019

(86) PCT No.: PCT/US2019/046188
§ 371 (c)(1),
(2) Date: Feb. 12, 2021

(87) PCT Pub. No.: WO2020/036883
PCT Pub. Date: Feb. 20, 2020

(65) Prior Publication Data
US 2021/0168751 A1 Jun. 3, 2021

Related U.S. Application Data

(60) Provisional application No. 62/718,263, filed on Aug. 13, 2018.

(51) Int. Cl.
*H04W 8/26* (2009.01)
*H04W 60/00* (2009.01)
(52) U.S. Cl.
CPC ............ *H04W 60/00* (2013.01); *H04W 8/26* (2013.01)

(58) Field of Classification Search
CPC ......... H04W 60/00; H04W 8/26; H04W 8/02; H04W 88/18; H04W 60/05; H04W 88/06; H04W 60/06
See application file for complete search history.

(56) References Cited

U.S. PATENT DOCUMENTS 11,202,246 B2 * 12/2021 Ryu ................... H04W 68/00
11,212,738 B2 * 12/2021 Kim .................... H04W 24/04
(Continued)

FOREIGN PATENT DOCUMENTS

WO   WO 2016-140507 A1   9/2016

OTHER PUBLICATIONS

LG Electronics, "Clarification on 5G-GUTI in EPS to 4GS Mobility Registration Procedure using N26", S2-181497, 3GPP TSG-SA WG2 Meeting #126, Montreal, Canada, Feb. 6, 2018, 5 pages.
(Continued)

*Primary Examiner* — Khawar Iqbal
(74) *Attorney, Agent, or Firm* — Sterne, Kessler, Goldstein & Fox P.L.L.C.

(57) ABSTRACT

Methods, systems, and storage media are described for the utilization of user equipment (UE) identifiers for registration in fifth generation (5G) systems. An apparatus of a user equipment includes processing circuitry to: retrieve a first 5G-GUTI from a memory; generate a registration request message that includes the first 5G-GUTI; encode the registration request message for transmission to a fifth-generation core (5GC) network of a second PLMN; receive a registration accept message that includes a second 5G-GUTI; and access the second PLMN using the second 5G-GUTI.

20 Claims, 10 Drawing Sheets

(56) References Cited

U.S. PATENT DOCUMENTS

| | | | |
|---|---|---|---|
| 2011/0287743 A1 | 11/2011 | Hu et al. | |
| 2016/0112943 A1 | 4/2016 | Horn et al. | |
| 2019/0075511 A1* | 3/2019 | Ryu | H04W 68/005 |
| 2020/0112898 A1* | 4/2020 | Ramle | H04W 8/08 |
| 2020/0267634 A1* | 8/2020 | Kim | H04W 48/16 |
| 2020/0396587 A1* | 12/2020 | Kim | H04W 8/04 |
| 2021/0282203 A1* | 9/2021 | Talebi Fard | H04W 76/12 |
| 2021/0314762 A1* | 10/2021 | Wong | H04W 76/27 |
| 2021/0314899 A1* | 10/2021 | Shan | H04W 60/00 |
| 2021/0321247 A1* | 10/2021 | Kim | H04W 8/12 |
| 2021/0321252 A1* | 10/2021 | Tamura | H04W 48/20 |
| 2022/0053603 A1* | 2/2022 | Talebi Fard | H04W 80/10 |
| 2022/0086748 A1* | 3/2022 | Qiao | H04W 8/18 |
| 2022/0353928 A1* | 11/2022 | Dao | H04W 4/08 |

OTHER PUBLICATIONS

Apple Inc., "Configure AMF to periodically re-allocate 5G-GUTI", S2-181778, 3GPP TSG-SA WG2 Meeting #126, Montreal, Canada, Feb. 23, 2018, 6 pages.

International Search Report and Written Opinion of the International Searching Authority directed to related International Patent Application No. PCT/US2019/046118, dated Feb. 20, 2020, 10 pages.

* cited by examiner

100

Retrieving, from memory, a first fifth-generation globally unique temporary identifier (5G-GUTI) assigned by a public land mobile network (PLMN) for the UE
105

Generating a registration request message that includes the first 5G-GUTI
110

Encoding the registration request message for transmission to a fifth-generation core (5GC) network of a second PLMN
115

Receiving a registration accept message that includes a second 5G-GUTI
120

Accessing the second PLMN using the second 5G-GUTI
125

FIG. 1

USE OF USER EQUIPMENT (UE) IDENTIFIERS FOR REGISTRATION IN FIFTH GENERATION (5G) SYSTEMS

RELATED APPLICATION

This application is a National Phase in the United States of PCT Application No. PCT/US2019/046188 filed on Aug. 12, 2019, which claims priority to U.S. Provisional patent Application No. 62/718,263, filed Aug. 13, 2018, each of which is incorporated by reference in its entirety.

BACKGROUND

Among other things, embodiments of the present disclosure are directed to the utilization of user equipment (UE) identifiers for registration in fifth generation (5G) systems. Some embodiments may help enable a UE connecting to a 5G system simultaneously via third generation partnership project (3GPP) and non-3GPP access.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 2:
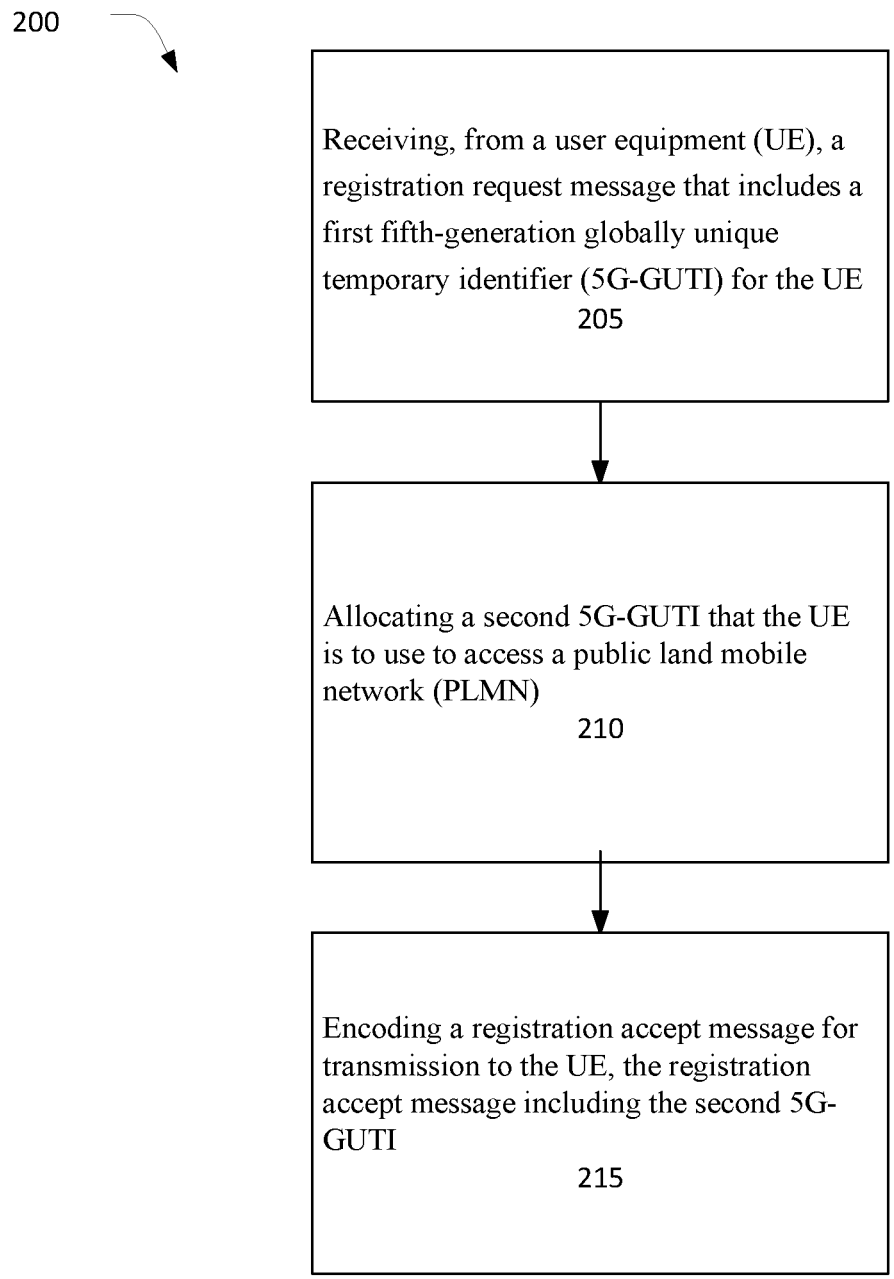

Embodiments discussed herein may relate to the utilization of user equipment (UE) identifiers for registration in fifth generation (5G) systems. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

A user equipment (UE) connecting to a 5G System simultaneously via 3GPP and non-3GPP access maintains two distinct Registration Management (RM) contexts, one for each access.

Figure 4A:
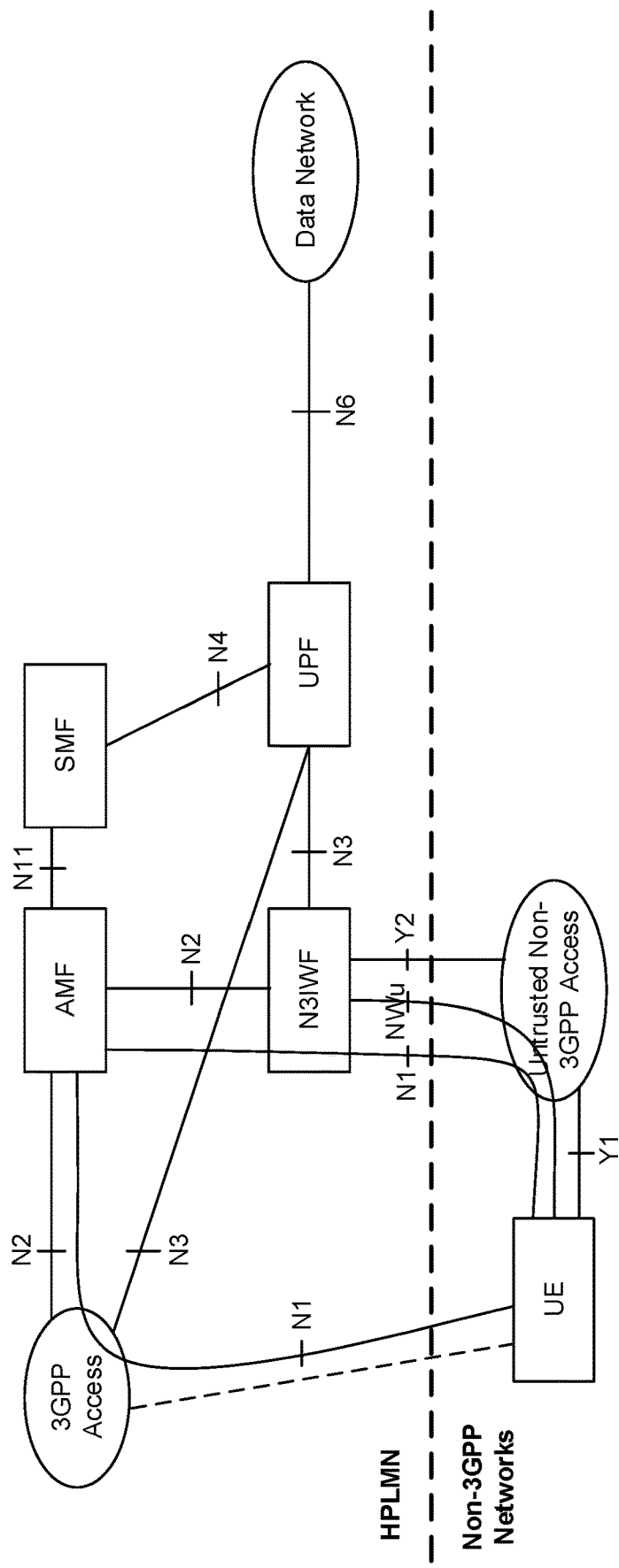
FIG. 4A illustrates an example of a non-roaming architecture for a 5G core network with non-3GPP access in accordance with some embodiments.
Figure 4B:
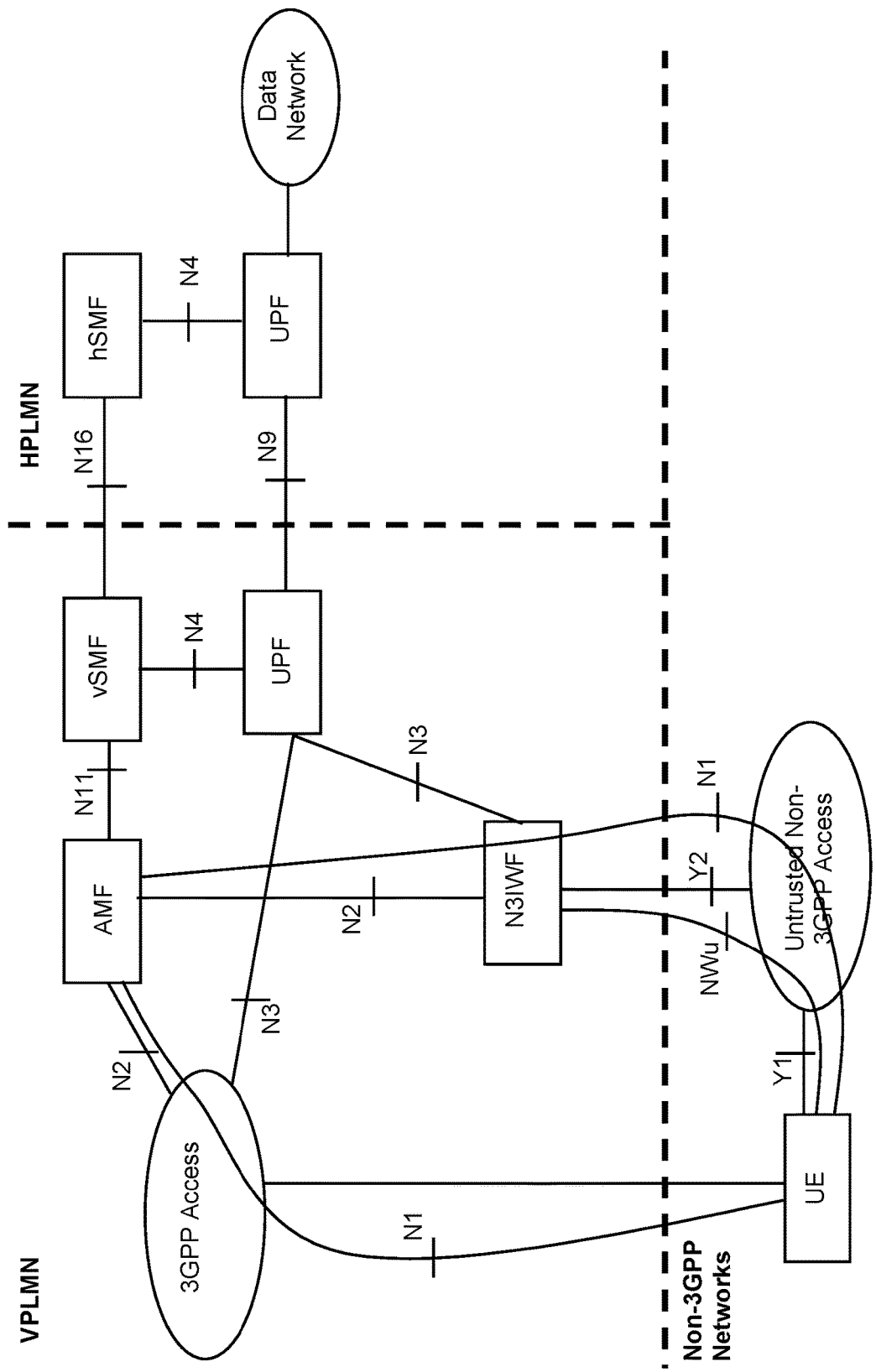
FIG. 4B illustrates an example of a home-routed roaming architecture for a 5G core network with non-3GPP access, with a non-3GPP interworking function (N3IWF) in the same visited public land mobile network (VPLMN) as 3GPP access in accordance with some embodiments.

The architecture for UE connecting to the 5G System via 3GPP and non-3GPP access can vary depending whether the UE is roaming or not, and whether the 3GPP and non-3GPP access reside in the same PLMN or not. FIGS. 4A and 4B illustrate examples of two configurations: a non-roaming architecture (FIG. 4A) and a roaming architecture where the 3GPP and non-3GPP access reside in the same VPLMN (FIG. 4B).

According to the 5G System specifications, a UE connecting to the 5G System simultaneously via 3GPP and non-3GPP access belonging to the same PLMN or to equivalent PLMNs shall use the same UE temporary identifier (5G-GUTI) over both accesses. The underlying assumption is that on the network side the UE context is handled by a single AMF.

If the UE is already registered over one access (e.g. non-3GPP access) in PLMN A and attempts to register over the other access (e.g. 3GPP access) in PLMN B, the UE needs to follow certain logic on how to select the 5G-GUTI that it provides in the Registration Request over the second access. The underlying assumption currently is that if the PLMN of the second access (PLMN B) is the same or equivalent to the PLMN of the first access (PLMN A), then the UE needs to indicate in the Registration Request the 5G-GUTI used on the first access (i.e. PLMN A), as per the registration procedure of 3GPP TS 23.502 v. 15.2.0, 2018-06-19, clause 4.2.2.2 which states that:

When the UE is performing an Initial Registration (i.e., the UE is in RM-DEREGISTERED state) the UE shall indicate its UE identity as follows:

If the UE is in RM-DEREGISTERED state, the UE shall include a native 5G-GUTI assigned by the same or an equivalent PLMN, if available; otherwise, the UE shall include a native 5G-GUTI assigned by other PLMNs (if available).

If the UE is already in RM-REGISTERED state via another access in the same or equivalent PLMN, it shall indicate a native 5G-GUTI (if available) allocated by the AMF during the previous Registration procedure.

If the UE is already in RM-REGISTERED state via another access in a PLMN (e.g. PLMN A) not equivalent to the PLMN the UE is trying to register with (e.g. PLMN B), the UE shall include a native 5G-GUTI (if available) assigned by a PLMN (e.g. PLMN C) that is not the same or equivalent to the PLMN in which the UE is already in RM-REGISTERED state (PLMN A).

Otherwise, the UE shall include its SUCI in the Registration Request as defined in TS 33.501.

Behind this logic is the assumption that for two AMFs residing in equivalent PLMNs: 1) the new AMF will always be able to fetch the UE context from the old AMF, and 2) that the old NG-RAN node (e.g. N3IWF) will have N2 connectivity to both AMFs.

The first assumption (i.e., inter-AMF fetch) may be realistic in particular because the 5G Core relies on a Service-Based Architecture (HTTP-based) that facilitates the communication between any pair of Core Network nodes.

The second assumption (i.e. NG-RAN node having N2 connectivity to both AMFs) is less likely. If there is no such connectivity the current assumption in the specification may lead to an undesirable situation as described below:

Suppose UE is registered over first access in PLMN A

UE attempts to register with PLMN B that is equivalent to PLMN A. In the Registration Request the UE provides the 5G-GUTI assigned by PLMN A.

AMF in PLMN B is able to retrieve the UE context in PLMN A, but is unable to move the N2 connectivity from the NG-RAN node in PLMN A to the AMF in PLMN B.

Given the fixed logic in the current specification the UE starts using the 5G-GUTI assigned by PLMN B for both accesses. This will obviously create an error situation on the old access.

The present disclosure provides embodiments for fixing this error situation. Embodiments herein provide simplified UE logic for indication of a 5G-GUTI in the Registration Request message. Embodiments herein provide an explicit indication in the Registration Accept message wherein the network indicates to the UE whether the 5G-GUTI assigned via the second access shall also be used via the first access. By using an explicit indication from the network side the operators have flexibility to support concurrent 3GPP and non-3GPP access without having to implement full connectivity between NG-RAN nodes and AMFs residing in their own PLMN or in an equivalent PLMN. The embodiments herein may be implemented in the Registration Procedure example shown below.

4.2.2.2.2 General Registration

Figure 4C:
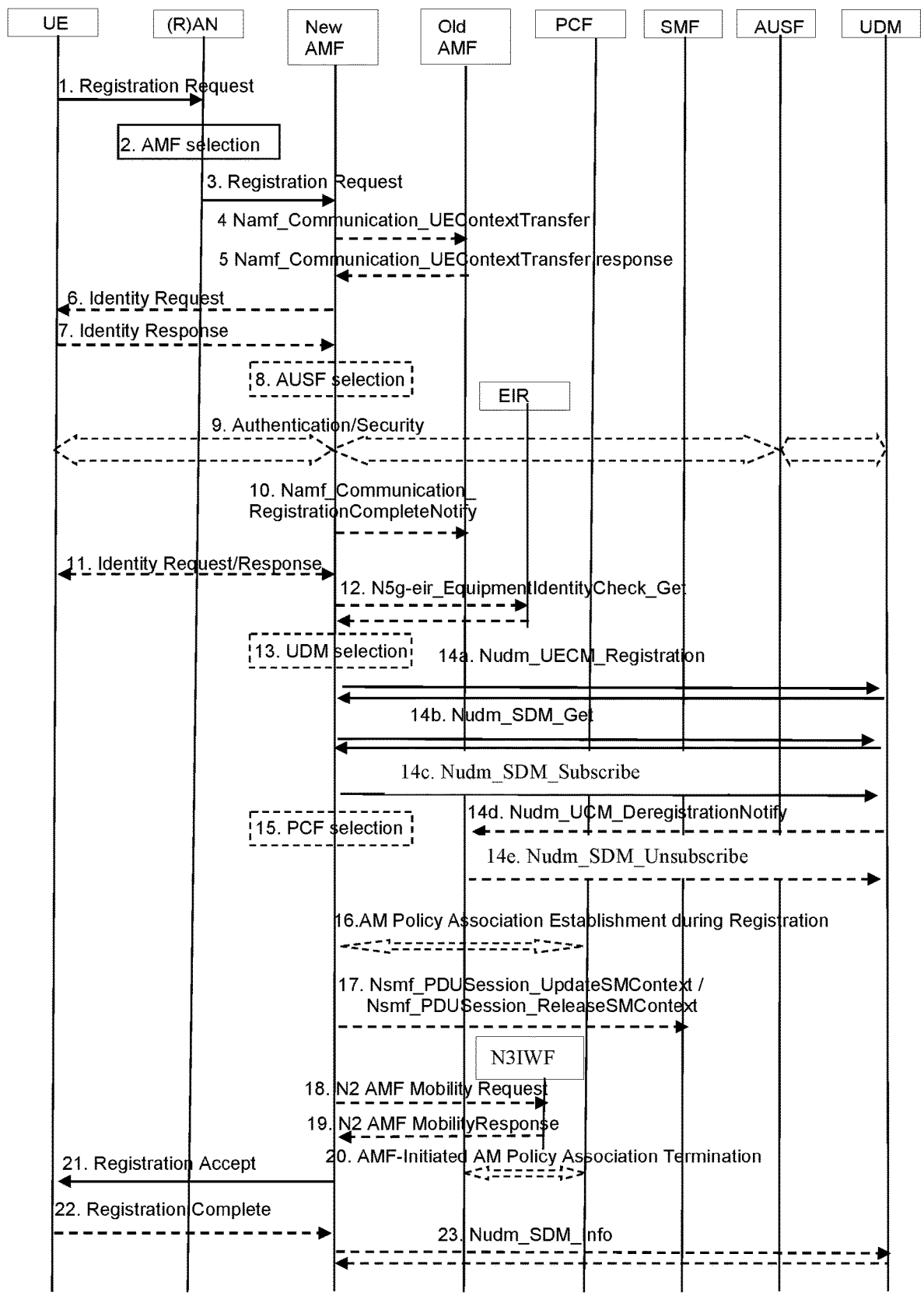
FIG. 4C illustrates an example of a registration procedure in accordance with some embodiments.

FIG. 4C shows an example of a registration procedure according to various embodiments. The procedure of FIG. 4C may operate as follows:

1. UE to (R)AN: AN message (AN parameters, Registration Request (Registration type, SUCI or 5G-GUTI or PEI, last visited TAI (if available), Security parameters, Requested NSSAI, [Mapping Of Requested NSSAI], UE Radio Capability Update, UE MM Core Network Capability, PDU Session status, List Of PDU Sessions To Be Activated, Follow on request, MICO mode preference, Requested DRX parameters) and UE Policy Container (the list of PSIs)).

In the case of NG-RAN, the AN parameters include e.g. SUCI or the 5G-GUTI, the Selected PLMN ID and Requested NSSAI, the AN parameters also include Establishment cause. The Establishment cause provides the reason for requesting the establishment of an RRC connection.

The Registration type indicates if the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry, see clause 4.2.2.2.1) or an Emergency Registration (i.e. the UE is in limited service state).

When the UE is performing an Initial Registration (i.e., the UE is in RM-DEREGISTERED state) the UE shall indicate its UE identity as follows:

If the UE is in RM-DEREGISTERED state, the UE shall include a native 5G-GUTI assigned by the same or an equivalent PLMN, if available; otherwise, the UE shall include a native 5G-GUTI assigned by other PLMNs (if available).

If the UE is already in RM-REGISTERED state via another access in the same or equivalent PLMN, it shall indicate a native 5G-GUTI (if available) allocated by the AMF during the previous Registration procedure.

If the UE is already in RM-REGISTERED state via another access in a PLMN (e.g. PLMN A) not equivalent to the PLMN the UE is trying to register with (e.g. PLMN B), the UE shall include a native 5G-GUTI (if available) assigned by a PLMN (e.g. PLMN C) that is not the same or equivalent to the PLMN in which the UE is already in RM-REGISTERED state (PLMN A).

Otherwise, the UE shall include its SUCI in the Registration Request.

Additionally or alternatively, when the UE is performing an Initial Registration to a serving PLMN the UE shall indicate its UE identity in the following order:

A native 5G-GUTI assigned by the serving PLMN (if available).

Otherwise, a native 5G-GUTI assigned by a PLMN that is equivalent to the serving PLMN (if available).

Otherwise, a native 5G-GUTI assigned by any PLMN (if available).

Otherwise, the UE shall include its SUCI in the Registration Request.

When the UE is performing an Initial Registration (i.e., the UE is in RM-DEREGISTERED state) with a native 5G-GUTI then the UE shall indicate the related GUAMI information in the AN parameters. When the UE is performing an Initial Registration with its SUCI, the UE shall not indicate any GUAMI information in the AN parameters.

If the UE previously received a UE Configuration Update Command indicating that the UE needs to re-register and that it shall not provide the 5G-GUTI in access stratum signalling when performing the Registration procedure, the UE performs a Mobility Registration and shall not include any GUAMI information in the AN parameters. For an Emergency Registration, the SUCI shall be included if the UE does not have a valid 5G-GUTI available; the PEI shall be included when the UE has no SUPI and no valid 5G-GUTI. In other cases, the 5G-GUTI is included and it indicates the last serving AMF.

The UE may provide the UE's usage setting based on its configuration. In case of Initial Registration or Mobility Registration Update, the UE includes the Mapping Of Requested NSSAI (if available), which is the mapping of each S-NSSAI of the Requested NSSAI to the S-NSSAIs of the Configured NSSAI for the HPLMN, to ensure that the network is able to verify whether the S-NSSAI(s) in the Requested NSSAI are permitted based on the Subscribed S-NSSAIs.

In the case of Mobility Registration Update, the UE includes in the "List of PDU Sessions To Be Activated" the PDU Sessions for which there are pending uplink data. In some cases the UE may include PDU Sessions in the "List of PDU Sessions To Be Activated" even if there are no pending uplink data for those PDU Sessions.

The UE MM Core Network Capability is provided by the UE and handled by AMF. The UE includes in the UE MM Core Network Capability an indication if it supports Request Type flag "handover" for PDN connectivity request during the attach procedure.

If available, the last visited TAI shall be included in order to help the AMF produce Registration Area for the UE.

The Security parameters are used for Authentication and integrity protection. Requested NSSAI indicates the Network Slice Selection Assistance Information. The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE. The List Of PDU Sessions To Be Activated is included to indicate the PDU Session(s) for which the UE intends to activate UP connections. A PDU Session corresponding to a LADN shall not be included in the List Of PDU Sessions To Be Activated when the UE is outside the area of availability of the LADN. The Follow on request is included when the UE has pending uplink signalling and the UE doesn't include List Of PDU Sessions To Be Activated, or the Registration type indicates the UE wants to perform an Emergency Registration. In Initial Registration and Mobility Registration Update, UE provides the UE Requested DRX parameters.

The UE provides UE Radio Capability Update indication.

The UE access selection and PDU session selection identifies the list of UE access selection and PDU session selection policy information stored in the UE. They are used by the PCF to determine if the UE has to be updated with new PSIs or if some of the stored ones are no longer applicable and have to be removed.

2. If a 5G-GUTI is not included or the 5G-GUTI does not indicate a valid AMF the (R)AN, based on (R)AT and Requested NSSAI, if available, selects an AMF The (R)AN selects an AMF. If UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured, in (R)AN, to perform AMF selection.

3. (R)AN to new AMF: N2 message (N2 parameters, Registration Request (as described in step 1) and UE access selection and PDU session selection information, UE Context request).

When NG-RAN is used, the N2 parameters include the Selected PLMN ID, Location Information and Cell Identity related to the cell in which the UE is camping.

When NG-RAN is used, the N2 parameters also include the Establishment cause. Mapping Of Requested NSSAI is provided only if available.

If the Registration type indicated by the UE is Periodic Registration Update, then steps 4 to 20 may be omitted.

4. [Conditional] new AMF to old AMF: Namf_Communication_UEContextTransfer (complete Registration Request) or new AMF to UDSF: Nudsf_Unstructured_Data Management_Query( )

(With UDSF Deployment): If the UE's 5G-GUTI was included in the Registration Reqest and the serving AMF has changed since last Registration procedure, new AMF and old AMF are in the same AMF Set and UDSF is deployed, the new AMF retrieves the stored UE's SUPI and UE context directly from the UDSF using Nudsf_UnstructuredDataManagement_Query service operation or they can share stored UE context via implementation specific means if UDSF is not deployed. This includes also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, to request the UE's SUPI and UE Context. See clause 5.2.2.2.2 for details of this service operation. In this case, the old AMF uses either 5G-GUTI and the integrity protected complete Registration request NAS message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF.

NOTE 1: The new AMF sets the indication that the UE is validated according to step 9a, in case the new AMF has performed successful UE authentication after previous integrity check failure in the old AMF.

NOTE 2: The NF consumers does not need to subscribe for the events once again with the new AMF after the UE is successfully registered with the new AMF.

If the new AMF has already received UE contexts from the old AMF during handover procedure, then step 4, 5 and 10 shall be skipped.

For an Emergency Registration, if the UE identifies itself with a 5G-GUTI that is not known to the AMF, steps 4 and 5 are skipped and the AMF immediately requests the SUPI from the UE. If the UE identifies itself with PEI, the SUPI request shall be skipped. Allowing Emergency Registration without a user identity is dependent on local regulations.

5. [Conditional] old AMF to new AMF: Response to Namf_Communication_UEContextTransfer (SUPI, UE Context in AMF (as per Table 5.2.2.2-1)) or UDSF to new AMF: Nudsf_Unstructured_Data Management_Query( ). If the UDSF was queried in step 4, the UDSF responds to the new AMF for the Nudsf_Unstructured_Data Management_Query invocation with the related contexts including established PDU Sessions, the old AMF includes SMF information DNN, S-NSSAI(s) and PDU Session ID, active NGAP UE-TNLA bindings to N3IWF, the old AMF includes information about the NGAP UE-TNLA bindings. If the Old AMF was queried in step 4, Old AMF responds to the new AMF for the Namf_Communication_UE-ContextTransfer invocation by including the UE's SUPI and UE Context.

If old AMF holds information about established PDU Session(s), the old AMF includes SMF information, DNN(s), S-NSSAI(s) and PDU Session ID(s).

If old AMF holds information about active NGAP UE-TNLA bindings to N3IWF, the old AMF includes information about the NGAP UE-TNLA bindings.

If old AMF fails the integrity check of the Registration Request NAS message, the old AMF shall indicate the integrity check failure.

If old AMF holds information about AM Policy Association, the old AMF includes the information about the AM Policy Association including the policy control request trigger and PCF ID. In the roaming case, V-PCF ID and H-PCF ID are included.

NOTE 3: When new AMF uses UDSF for context retrieval, interactions between old AMF, new AMF and UDSF due to UE signaling on old AMF at the same time is implementation issue.

6. [Conditional] new AMF to UE: Identity Request ( ).
If the SUCI is not provided by the UE nor retrieved from the old AMF the Identity Request procedure is initiated by AMF sending an Identity Request message to the UE requesting the SUCI.

7. [Conditional] UE to new AMF: Identity Response ( ).
The UE responds with an Identity Response message including the SUCI. The UE derives the SUCI by using the provisioned public key of the HPLMN.

8. The AMF may decide to initiate UE authentication by invoking an AUSF. In that case, the AMF selects an AUSF based on SUPI or SUCI.
If the AMF is configured to support Emergency Registration for unauthenticated SUPIs and the UE indicated Registration type Emergency Registration, the AMF skips the authentication or the AMF accepts that the authentication may fail and continues the Registration procedure.

9a. Upon request from the AMF, the AUSF shall execute authentication of the UE. The AUSF selects a UDM and gets the authentication data from UDM.
Once the UE has been authenticated the AUSF provides relevant security related information to the AMF. In case the AMF provided a SUCI to AUSF, the AUSF shall return the SUPI to AMF only after the authentication is successful.

After successful authentication in new AMF, which is triggered by the integrity check failure in old AMF at step 5, the new AMF invokes step 4 above again and indicates that the UE is validated (i.e. through the reason parameter).

The AMF decides if the Registration Request needs to be rerouted as described in clause 4.2.2.2.3, where the initial AMF refers to the AMF.

9b The NAS security initiation is performed.

9c. Upon completion of NAS security function setup, the AMF initiates NGAP procedure to provide the 5G-AN with security context if the 5G-AN had requested for UE Context or if there is a need for AMF to provide this.

9d. The 5G-AN stores the security context and acknowledges to the AMF. The 5G-AN uses the security context to protect the messages exchanged with the UE.

10. [Conditional] new AMF to old AMF: Namf_Communication_RegistrationCompleteNotify ( ).

If the AMF has changed the new AMF notifies the old AMF that the registration of the UE in the new AMF is completed by invoking the Namf_Communication_RegistrationCompleteNotify service operation.

If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

See clause 5.2.2.2.3 for details of Namf_Communication_RegistrationCompleteNotify service operation.

11. [Conditional] new AMF to UE: Identity Request/Response (PEI).

If the PEI was not provided by the UE nor retrieved from the old AMF the Identity Request procedure is initiated by AMF sending an Identity Request message to the UE to retrieve the PEI. The PEI shall be transferred encrypted unless the UE performs Emergency Registration and cannot be authenticated.

For an Emergency Registration, the UE may have included the PEI in the Registration Request. If so, the PEI retrieval is skipped.

12. Optionally the new AMF initiates ME identity check by invoking the N5g-eir_EquipmentIdentityCheck_Get service operation (see clause 5.2.4.2.2).

The PEI check is performed as described in clause 4.7.

For an Emergency Registration, if the PEI is blocked, operator policies determine whether the Emergency Registration procedure continues or is stopped.

13. If step 14 is to be performed, the new AMF, based on the SUPI, selects a UDM, then UDM may select a UDR instance.

The AMF selects a UDM.

14a-c. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration and subscribes to be notified when the UDM deregisters this AMF. The UDM stores the AMF identity associated to the Access Type and does not remove the AMF identity associated to the other Access Type. The UDM may store information provided at registration in UDR, by Nudr_UDM_Update.

The AMF retrieves the Access and Mobility Subscription data, SMF Selection Subscription data and UE context in SMF data using Nudm_SDM_Get. This requires that UDM may retrieve this information from UDR by Nudr_UDM_Query. After a successful response is received, the AMF subscribes to be notified using Nudm_SDM_Subscribe when the data requested is modified, UDM may subscribe to UDR by Nudr_UDM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" is included in the Access and Mobility Subscription data provided to the AMF.

The new AMF provides the Access Type it serves for the UE to the UDM and the Access Type is set to "3GPP access". The UDM stores the associated Access Type together with the serving AMF in UDR by Nudr_UDM_Update.

The new AMF creates an UE context for the UE after getting the Access and Mobility Subscription data from the UDM.

For an Emergency Registration in which the UE was not successfully authenticated, the AMF shall not register with the UDM.

For an Emergency Registration, the AMF shall not check for access restrictions, regional restrictions or subscription restrictions. For an Emergency Registration, the AMF shall ignore any unsuccessful registration response from UDM and continue with the Registration procedure.

14d. When the UDM stores the associated Access Type (e.g. 3GPP) together with the serving AMF as indicated in step 14a, it will cause the UDM to initiate a Nudm_UECM_DeregistrationNotification (see clause 5.2.3.2.2) to the old AMF corresponding to the same (e.g. 3GPP) access, if one exists. The old AMF removes the UE context of the UE. If the serving NF removal reason indicated by the UDM is Initial Registration, then, as described in clause 4.2.2.3.2, the old AMF invokes the Nsmf_PDUSession_ReleaseSMContext (SUPI, PDU Session ID) service operation towards all the associated SMF(s) of the UE to notify that the UE is deregistered from old AMF. The SMF(s) shall release the PDU Session on getting this notification.

14e. The Old AMF unsubscribes with the UDM for subscription data using Nudm_SDM_unsubscribe.

15. If the AMF decides to initiate PCF communication, e.g. the AMF has not yet obtained Access and Mobility policy for the UE or if the Access and Mobility policy in the AMF are no longer valid, the AMF acts as follows.

If the new AMF receives PCF ID(s) included in UE context from the old AMF in step 5, the AMF contacts the (V-)PCF identified by the (V-)PCF ID.

If the (V-)PCF identified by the (V-)PCF ID cannot be used (e.g. no response from the (V-)PCF) or there is no PCF ID received from the old AMF in step 5, the AMF selects a (V)-PCF and may select an H-PCF (for roaming scenario) according to the V-NRF to H-NRF interaction.

16. [Optional] new AMF performs an AM Policy Association Establishment. For an Emergency Registration, this step is skipped.

If the new AMF contacts the PCF identified by the (V-)PCF ID received during inter-AMF mobility in step 5, the new AMF shall include the PCF ID(s) in the Npcf_AMPolicyControl Create operation. This indication is not included by the AMF during initial registration procedure.

If the AMF notifies the Mobility Restrictions (e.g. UE location) to the PCF for adjustment, or if the PCF updates the Mobility Restrictions itself due to some conditions (e.g. application in use, time and date), the PCF shall provide the updated Mobility Restrictions to the AMF.

17. [Conditional] AMF to SMF: Nsmf_PDUSession_UpdateSMContext ( ).

For an Emergency Registered UE, this step is applied when the Registration Type is Mobility Registration Update.

The AMF invokes the Nsmf_PDUSession_UpdateSMContext (see clause 5.2.8.2.6) in the following scenario(s):

If the "List Of PDU Sessions To Be Activated" is included in the Registration Request in step 1, the AMF sends Nsmf_PDUSession_UpdateSMContext Request to SMF(s) associated with the PDU Session(s) in order to activate User Plane connections of these PDU Session(s). Steps from step 5 onwards described in clause 4.2.3.2 are executed to complete the User Plane connection activation without sending MM NAS Service Accept from the AMF to (R)AN described in step 12 of clause 4.2.3.2.

When the serving AMF has changed, the new serving AMF notifies the SMF for each PDU Session that it has taken over the responsibility of the signalling path towards the UE: the new serving AMF invokes the Nsmf_PDUSession_UpdateSMContext service operation using SMF information received from the old AMF at step 5. It also indicates whether the PDU Session is to be re-activated.

Steps from step 5 onwards described in clause 4.2.3.2 are executed. In the case that the intermediate UPF insertion, removal, or change is performed for the PDU Session(s) not included in "PDU Session(s) to be re-activated", the procedure is performed without N11 and N2 interactions to update the N3 user plane between (R)AN and 5GC.

The AMF invokes the Nsmf_PDUSession_ReleaseSMContext service operation towards the SMF in the following scenario:

If any PDU Session status indicates that it is released at the UE, the AMF invokes the Nsmf_PDUSession_ReleaseSMContext service operation towards the SMF in order to release any network resources related to the PDU Session.

If the serving AMF is changed, the new AMF shall wait until step 18 is finished with all the SMFs associated with the UE. Otherwise, steps 19 to 22 can continue in parallel to this step.

18. New AMF to N3IWF: N2 AMF Mobility Request ( ).

If the AMF has changed and the old AMF has indicated an existing NGAP UE association towards a N3IWF, and if the new AMF has N2 connectivity towards the N3IWF the new AMF creates an NGAP UE association towards the N3IWF to which the UE is connected. This automatically releases the existing NGAP UE association between the old AMF and the N3IWF 19. N3IWF to new AMF: N2 AMF Mobility Response ( ).

20. [Conditional] old AMF to (V-)PCF: AMF-Initiated Policy Association Termination. If the old AMF previously initiated a Policy Association to the PCF, and the old AMF did not transfer the PCF ID(s) to the new AMF (e.g. new AMF is in different PLMN), the old AMF performs an AMF-initiated Policy Association Termination procedure, as defined in clause 4.16.3.2, to delete the association with the PCF.

21. New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26), Network Slicing Subscription Change Indication. The Allowed NSSAI for the Access Type for the UE is included in the N2 message carrying the Registration Accept message.

The AMF sends a Registration Accept message to the UE indicating that the Registration Request has been accepted. 5G-GUTI is included if the AMF allocates a new 5G-GUTI. If the UE is already in RM-REGISTERED state via another access in the same or equivalent PLMN, and if the AMF has succeeded in establishing N2 connectivity with the NG-(R)AN node for the other access, the AMF shall include an indication that the UE shall use the 5G-GUTI received in the Registration Accept for both registrations. If no 5G-GUTI is included in the Registration Accept, then the UE uses the 5G-GUTI assigned for the existing registration also for the new registration. If the AMF allocates a new Registration area, it shall send the Registration area to the UE via Registration Accept message. If there is no Registration area included in the Registration Accept message, the UE shall consider the old Registration Area as valid. Mobility Restrictions is included in case mobility restrictions applies for the UE and Registration Type is not Emergency Registration. The AMF indicates the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in step 18 and receives rejection from the SMF, then the AMF indicates to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF shall indicate the PDU Session status to the UE. The Mapping Of Allowed NSSAI is the mapping of each S-NSSAI of the Allowed NSSAI to the S-NSSAIs of the Configured NSSAI for the HPLMN. The Mapping Of Configured NSSAI is the mapping of each S-NSSAI of the Configured NSSAI for the Serving PLMN to the S-NSSAIs of the Configured NSSAI for the HPLMN. The AMF shall include in the Registration Accept message the LADN Information for LADNs, defined in TS 23.501 [2] clause 5.6.5, that are available within the Registration area determined by the AMF for the UE. If the UE included MICO mode in the request, then AMF responds whether MICO mode should be used.

In the case of registration over 3GPP access, the AMF sets the IMS Voice over PS session supported Indication. In order to set the IMS Voice over PS session supported Indication the AMF may need to perform the UE/RAN Radio information and Compatibility Request procedure in clause 4.2.8a to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage.

In the case of registration over non-3GPP access, the AMF sets the IMS Voice over PS session supported Indication.

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" is included in the Registration Accept message to the UE to inform the UE whether configuration of Access Identity 1 is valid within the selected PLMN. The AMF sets the Interworking without N26 parameter.

RRC Inactive Assistance Information might be provided to NG-RAN in this step.

If the UDM intends to indicate the UE that subscription has changed, the Network Slicing Subscription Change Indication is included. If the AMF includes Network Slicing Subscription Change Indication, then the UE shall locally erase all the network slicing configuration for all PLMNs and, if applicable, update the configuration for the current PLMN based on any received information.

22. [Conditional] UE to new AMF: Registration Complete ( ).

The UE sends a Registration Complete message to the AMF when it has successfully updated itself after receiving a Network Slicing Subscription Change Indication in step 22.

The UE sends a Registration Complete message to the AMF to acknowledge if a new 5G-GUTI was assigned.

When the "List Of PDU Sessions To Be Activated" is not included in the Registration Request, the AMF releases the signalling connection with UE, according to clause 4.2.6.

When the Follow on request is included in the Registration Request, the AMF should not release the signalling connection after the completion of the Registration procedure.

If the AMF is aware that some signalling is pending in the AMF or between the UE and the 5GC, the AMF should not release the signalling connection immediately after the completion of the Registration procedure.

23. [Conditional] AMF to UDM: If the Access and Mobility Subscription data provided by UDM to AMF in 14b includes Steering of Roaming information with an indication that the UDM requests an acknowledgement of the reception of this information from the UE, the AMF provides the UE acknowledgement to UDM using Nudm_SDM_Info.

The mobility related event notifications towards the NF consumers are triggered at the end of this procedure for cases as described in clause 4.15.4.

The embodiments herein may be reflected in the Registration Procedure at operation 1 (Registration Request), operation 18 (N2 AMF Mobility Request), and operation 21 (Registration Accept).

At operation 1, when the UE is performing an Initial Registration to a serving PLMN the UE shall indicate its UE identity in the following order: a native 5G-GUTI assigned by the serving PLMN (if available); otherwise, a native 5G-GUTI assigned by a PLMN that is equivalent to the serving PLMN (if available); otherwise, a native 5G-GUTI assigned by any PLMN (if available); otherwise, the UE shall include its SUCI in the Registration Request;

At operation 18 (new AMF to N3IWF: N2 AMF Mobility Request ( )), If the AMF has changed and the old AMF has indicated an existing NGAP UE association towards a N3IWF, and if the new AMF has N2 connectivity towards the N3IWF the new AMF creates an NGAP UE association towards the N3IWF to which the UE is connected. This automatically releases the existing NGAP UE association between the old AMF and the N3IWF At operation 21, New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26), Network Slicing Subscription Change Indication.

The AMF sends a Registration Accept message to the UE indicating that the Registration Request has been accepted. 5G-GUTI is included if the AMF allocates a new 5G-GUTI. If the UE is already in RM-REGISTERED state via another access in the same or equivalent PLMN, and if the AMF has succeeded in establishing N2 connectivity with the NG-(R)AN node for the other access, the AMF shall include an indication that the UE shall use the 5G-GUTI received in the Registration Accept for both registrations. If no 5G-GUTI is included in the Registration Accept, then the UE uses the 5G-GUTI assigned for the existing registration also for the new registration.

Note that the indication in the Registration Accept message can also have a different semantics. E.g. instead of indicating to the UE whether the 5G-GUTI assigned via the second access shall also be used via the first access, it could indicate that the registration was "accepted for 3GPP access and non-3GPP access". The meaning is for both cases the same, i.e. the UE is registered for 3GPP access and non-3GPP access to the same AMF and at it shall use the same 5G-GUTI via both accesses.

5.3.2.4 Support of a UE Registered Over Both 3GPP and Non-3GPP Access

For a given serving PLMN there is one RM context for a UE for each access, e.g. when the UE is consecutively or simultaneously served by a 3GPP access and by a non-3GPP access (via an N3IWF) of the same PLMN. UDM manages separate/independent UE Registration procedures for each access.

When served by the same PLMN for 3GPP and non-3GPP accesses, an UE is served by the same AMF except in the temporary situation, e.g., after a mobility from EPS while the UE has PDU Sessions associated with non-3GPP access.

An AMF associates multiple access-specific RM contexts for an UE with:
- a 5G-GUTI that is common to both 3GPP and Non-3GPP accesses. This 5G-GUTI is globally unique.
- a Registration state per access type (3GPP/Non-3GPP)
- a Registration Area per access type: one Registration Area for 3GPP access and another Registration Area for non 3GPP access. Registration Areas for the 3GPP access and the Non-3GPP access are independent.
- timers for 3GPP access:
  - a Periodic Registration timer; and
  - a Mobile Reachable timer and an Implicit Deregistration timer.
- timers for non-3GPP access:
  - a UE Non-3GPP Deregistration timer; and
  - a Network Non-3GPP Implicit Deregistration timer.

The AMF does not provide a Periodic Registration Timer for the UE over a Non-3GPP access. Consequently, the UE need not perform Periodic Registration Update procedure over Non-3GPP access. Instead, during the Initial Registration procedure and Re-registration, the UE is provided by the network with a UE Non-3GPP Deregistration timer that starts when the UE enters non-3GPP CM-IDLE state.

When the 3GPP access and the non-3GPP access for the same UE are served by the same PLMN or equivalent PLMNs, the AMF assigns the same 5G-GUTI for use over both accesses (which presumes that there is control and user plane connectivity between nodes of the registered PLMN and its equivalent PLMN). Such a 5G-GUTI may be assigned or re-assigned over any of the 3GPP and Non-3GPP accesses. The 5G-GUTI is assigned upon a successful registration of the UE, and is valid over both 3GPP and Non-3GPP access to the same PLMN or equivalent PLMN for the UE. Upon performing an initial access over the Non-3GPP access or over the 3GPP access while the UE is already registered with the 5G System over another access of the same PLMN or equivalent PLMN, the UE provides the native 5G-GUTI for the other access. This enables the AN to select an AMF that maintains the UE context created at the previous Registration procedure via the GUAMI derived from the 5G-GUTI, and enables the AMF to correlate the UE request to the existing UE context via the 5G-GUTI.

If the UE is performing registration over one access and intends to perform registration over the other access in the same PLMN or equivalent PLMN (e.g. the 3GPP access and the selected N3IWF are located in the same PLMN), the UE shall not initiate the registration over the other access until the Registration procedure over first access is completed. To which access the UE performs registration first is up to UE implementation.

When the UE is successfully registered to an access (3GPP access or Non-3GPP access respectively) and the UE registers via the other access:
- if the second access is located in the same PLMN or equivalent PLMN (e.g. the UE is registered via a 3GPP access and selects a N3IWF located in the same PLMN), the UE shall use for the registration to the PLMN associated with the new access the 5G-GUTI that the UE has been provided with at the previous registration or UE configuration update procedure for the first access in the same PLMN or equivalent PLMN. Upon successful completion of the registration to the second access, if the network included a 5G-GUTI in the Registration Accept, the UE shall use the 5G-GUTI received in the Registration Accept for both registrations. If no 5G-GUTI is included in the Registration Accept, then the UE uses the 5G-GUTI assigned for the existing registration also for the new registration.
- if the second access is located in a PLMN different from the registered PLMN of the first access (i.e. not the registered PLMN or an equivalent PLMN of the registered PLMN), (e.g. the UE is registered to a 3GPP access and selects a N3IWF located in a PLMN different from the PLMN of the 3GPP access, or the UE is registered over Non-3GPP and registers to a 3GPP access in a PLMN different from the PLMN of the N3IWF), the UE shall use for the registration to the PLMN associated with the new access a 5G-GUTI only if it has got one previously received from a PLMN that is not the same and not equivalent to the PLMN the UE is already registered with. If the UE does not include a 5G-GUTI, the SUCI shall be used for the new registration. Upon successful completion of the registration to the second access, the UE has the two 5G-GUTIs (one per PLMN).

When a UE 5G-GUTI assigned during a Registration procedure over 3GPP (e.g. the UE registers first over a 3GPP access) is location-dependent, the same UE 5G-GUTI can be re-used over the Non-3GPP access when the selected N3IWF function is in the same PLMN as the 3GPP access. When an UE 5G-GUTI is assigned during a Registration procedure performed over a Non 3GPP access (e.g. the UE registers first over a non-3GPP access), the UE 5G-GUTI may not be location-dependent, so that the UE 5G-GUTI may not be valid for NAS procedures over the 3GPP access and, in this case, a new AMF is allocated during the Registration procedure over the 3GPP access.

When the UE is registered first via 3GPP access, if the UE registers to the same PLMN via Non-3GPP access, the UE shall send the GUAMI obtained via 3GPP access to the N3IWF, which uses the received GUAMI to select the same AMF as the 3GPP access.

The Deregistration Request message indicates whether it applies to the 3GPP access the Non-3GPP access, or both.

If the UE is registered on both 3GPP and Non-3GPP accesses and it is in CM-IDLE over Non-3GPP access, then the UE or AMF may initiate a Deregistration procedure over the 3GPP access to deregister the UE only on the Non-3GPP access, in which case all the PDU Sessions which are associated with the Non-3GPP access shall be released.

If the UE is registered on both 3GPP and non-3GPP accesses and it is in CM-IDLE over 3GPP access and in CM-CONNECTED over non-3GPP access, then the UE may initiate a Deregistration procedure over the non-3GPP access to deregister the UE only on the 3GPP access, in which case all the PDU Sessions which are associated with the 3GPP access shall be released.

Figure 5:
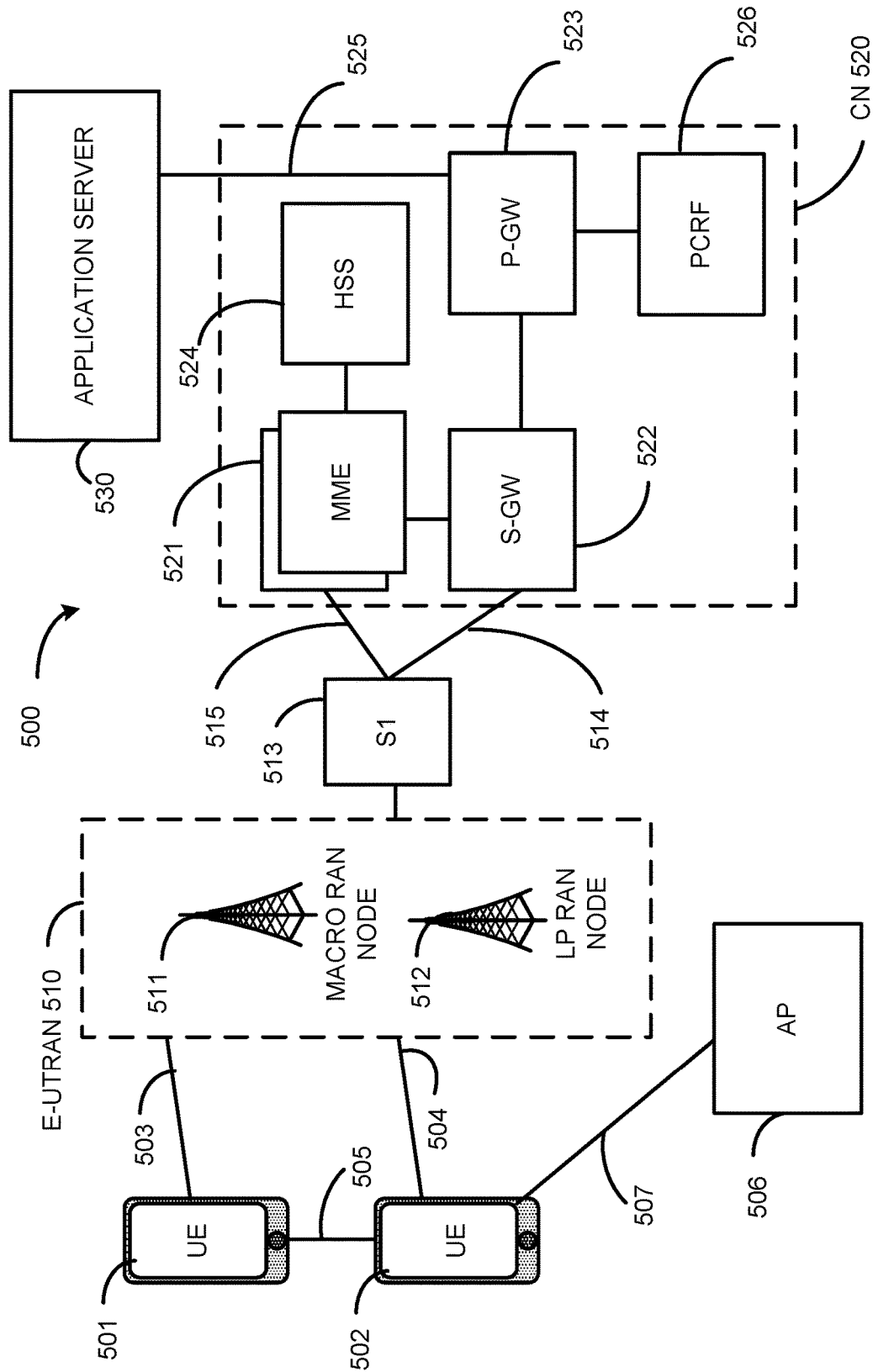
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
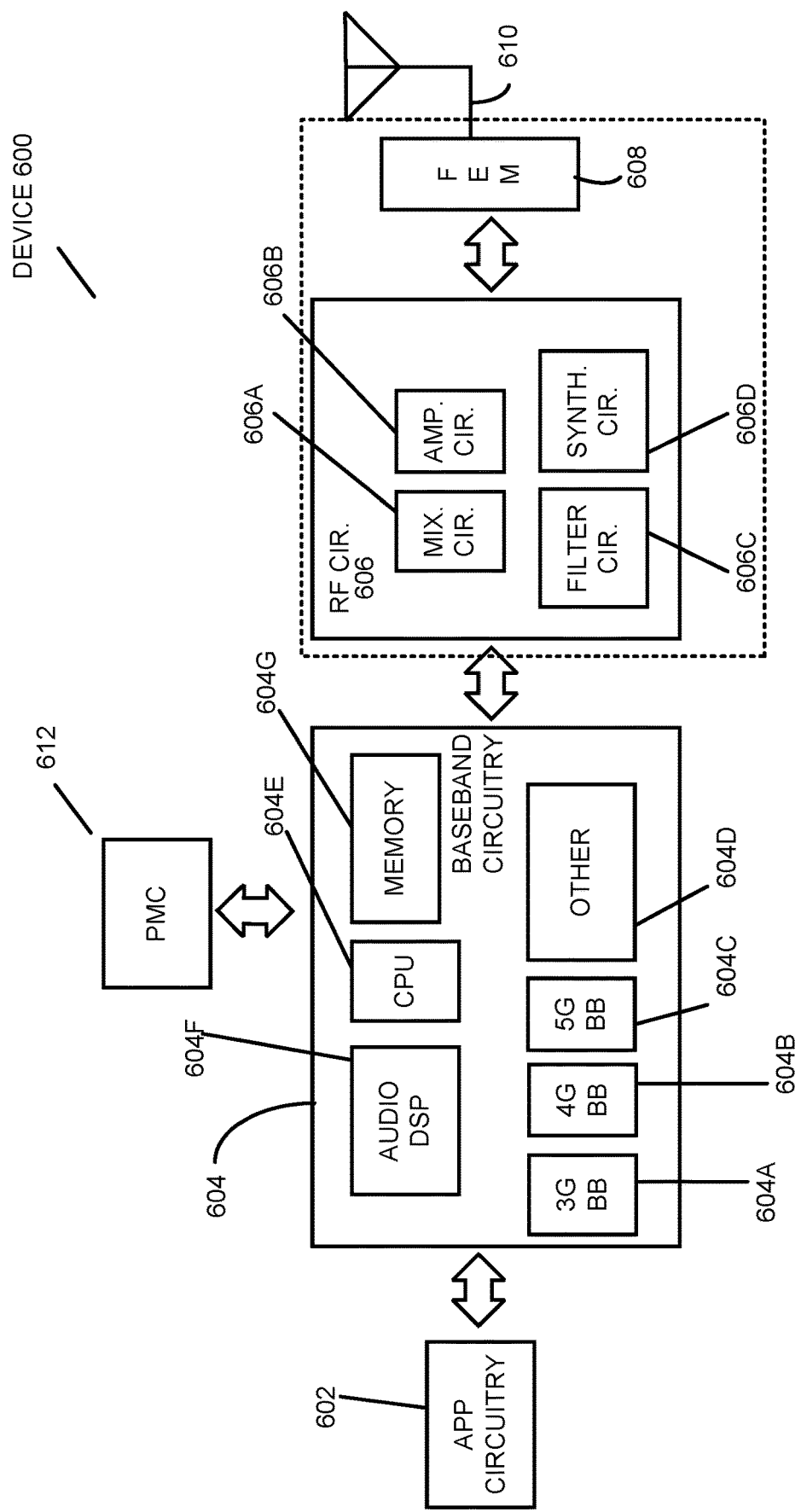
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
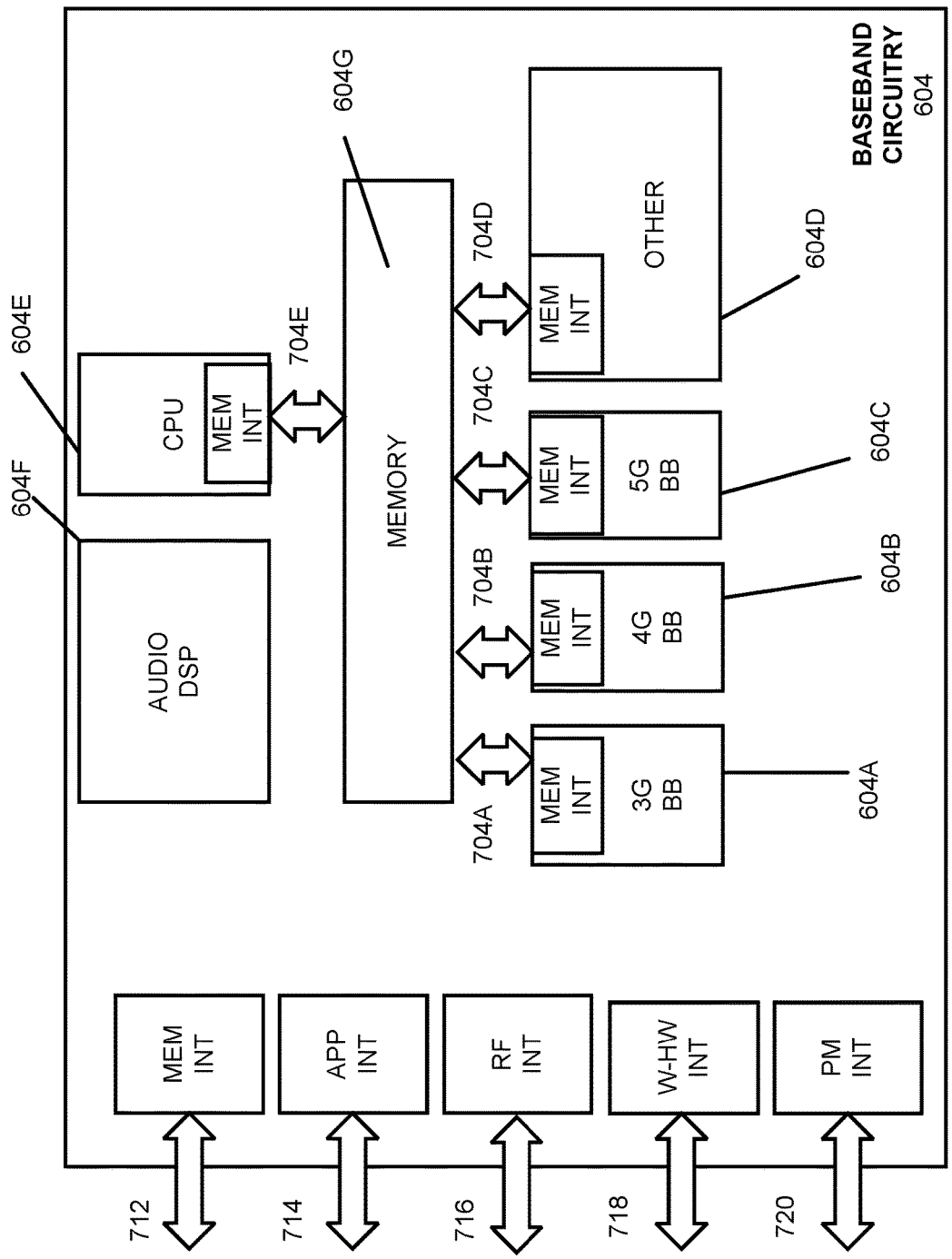
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
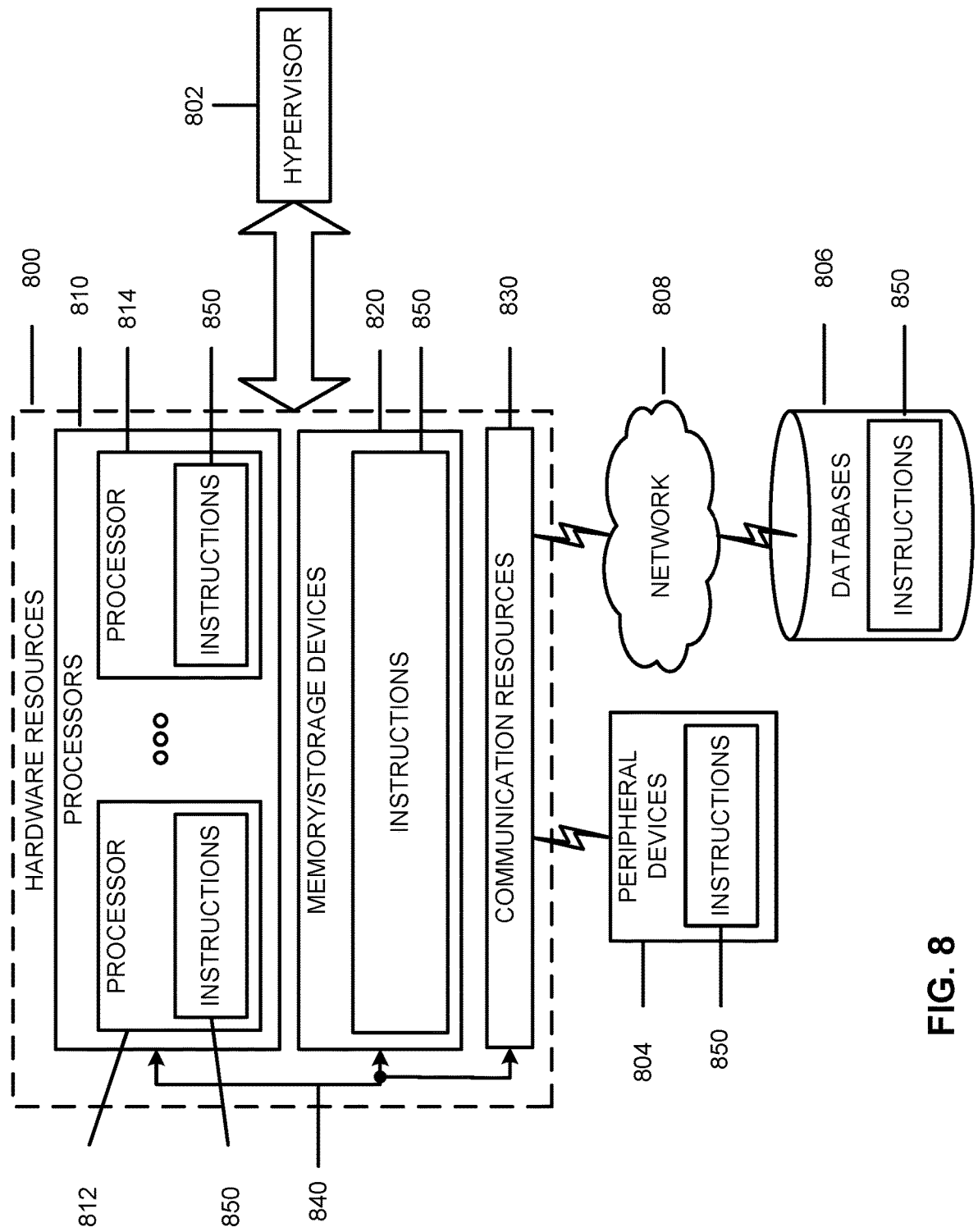
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 3:
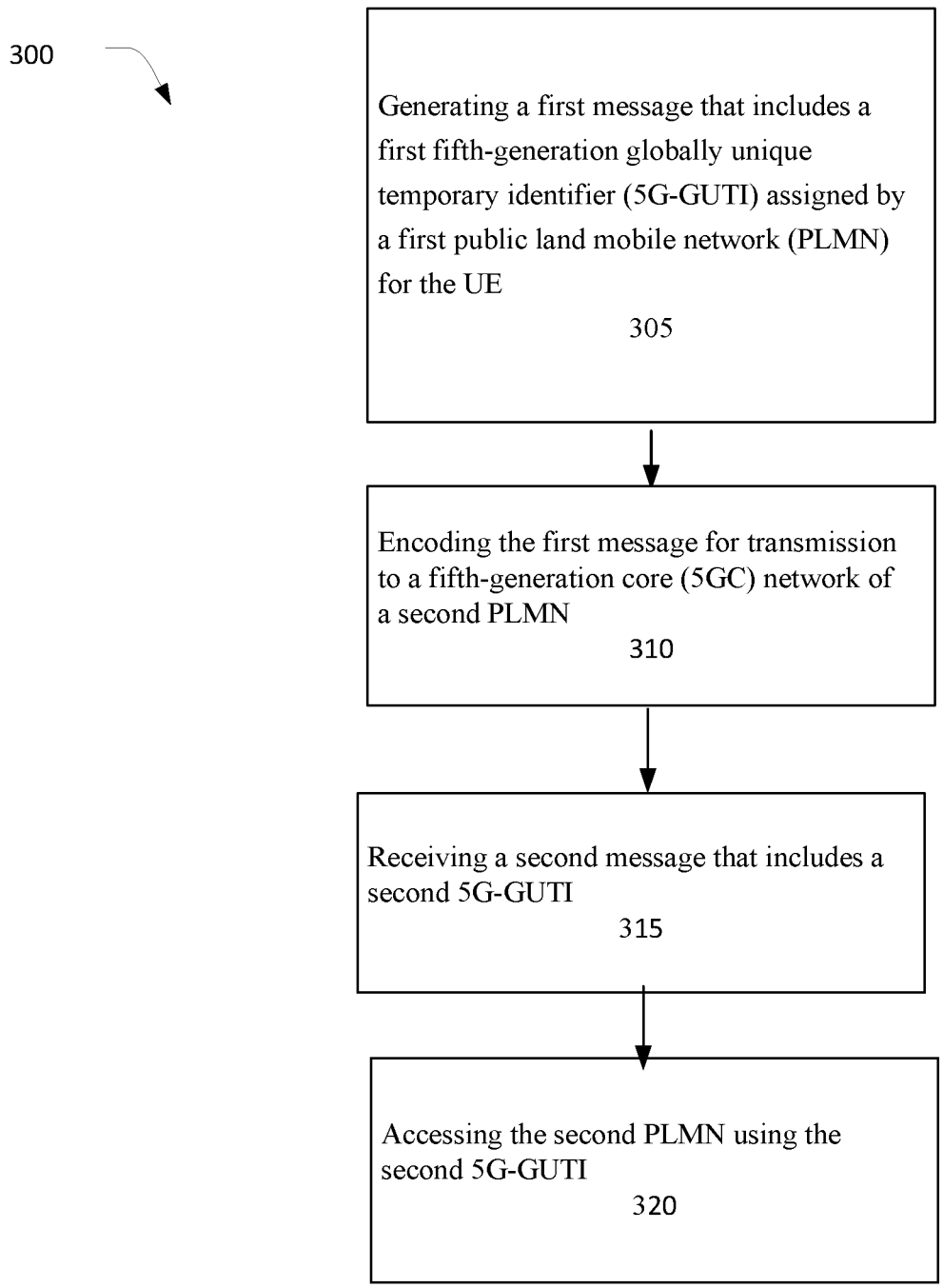

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a user equipment (UE) in accordance with some embodiments. In this example, operation flow/algorithmic structure 100 may include, at 105, retrieving, from memory, a first fifth-generation globally unique temporary identifier (5G-GUTI) assigned by a public land mobile network (PLMN) for the UE. Operation flow/algorithmic structure 100 may further include, at 110, generating a registration request message that includes the first 5G-GUTI. Operation flow/algorithmic structure 100 may further include, at 115, encoding the registration request message for transmission to a fifth-generation core (5GC) network of a second PLMN. Operation flow/algorithmic structure 100 may further include, at 120, receiving a registration accept message that includes a second 5G-GUTI. Operation flow/algorithmic structure 100 may further include, at 125, accessing the second PLMN using the second 5G-GUTI.

Another example of an operation flow/algorithmic structure is depicted in FIG. 2, which may be performed by next-generation NodeB (gNB) in accordance with some embodiments. In this example, operation flow/algorithmic structure 200 may include, at 205, receiving, from a user equipment (UE), a registration request message that includes a first fifth-generation globally unique temporary identifier (5G-GUTI) for the UE. Operation flow/algorithmic structure 200 may further include, at 210, allocating a second 5G-GUTI that the UE is to use to access a public land mobile network (PLMN). Operation flow/algorithmic structure 200 may further include, at 215, encoding a registration accept message for transmission to the UE, the registration accept message including the second 5 G-GUTI.

Another example of an operation flow/algorithmic structure is depicted in FIG. 3, which may be performed by a UE in accordance with some embodiments. In this example, operation flow/algorithmic structure 300 may include, at 305, generating a first message that includes a first fifth-generation globally unique temporary identifier (5G-GUTI) assigned by a first public land mobile network (PLMN) for the UE. Operation flow/algorithmic structure 300 may further include, at 310, encoding the first message for transmission to a fifth-generation core (5GC) network of a second PLMN. Operation flow/algorithmic structure 300 may further include, at 315, receiving a second message that includes a second 5G-GUTI. Operation flow/algorithmic structure 300 may further include, at 320, accessing the second PLMN using the second 5G-GUTI.

EXAMPLES

Some non-limiting examples are provided below.

Example 1 includes an apparatus of a user equipment (UE) comprising: memory to store a first fifth-generation globally unique temporary identifier (5G-GUTI) assigned by a public land mobile network (PLMN) for the UE; and processing circuitry, coupled with the memory, to: retrieve the first 5G-GUTI from the memory; generate a registration request message that includes the first 5G-GUTI; encode the registration request message for transmission to a fifth-generation core (5GC) network of a second PLMN; receive a registration accept message that includes a second 5G-GUTI; and access the second PLMN using the second 5G-GUTI.

Example 2 includes the apparatus of example 1 or some other example herein, wherein the first 5G-GUTI is a native 5G-GUTI assigned by the second PLMN.

Example 3 includes the apparatus of example 1 or some other example herein, wherein the first 5G-GUTI is a native 5G-GUTI assigned by a PLMN that is equivalent to the second PLMN.

Example 4 includes the apparatus of example 1 or some other example herein, wherein the first 5G-GUTI is a native 5G-GUTI assigned by a PLMN that is not the second PLMN or equivalent to the second PLMN.

Example 5 includes the apparatus of example 1 or some other example herein, wherein the registration request message is to register for access the second PLMN while already connected to a first PLMN.

Example 6 includes the apparatus of example 5 or some other example herein, wherein the processing circuitry is to access the second PLMN using the second 5G-GUTI and access the first PLMN using the first 5G-GUTI.

Example 6a includes the apparatus of example 5 or some other example herein, wherein the first PLMN is accessed via a first access type and the second PLMN is accessed via a second access type and the second PLMN is the same as or equivalent to the first PLMN.

Example 6b includes the apparatus of example 6a or some other example herein, wherein the first access type is non-3GPP access and the second access type is 3GPP access, or vice versa.

Example 7 includes the apparatus of example 1 or some other example herein, wherein the registration accept message includes an indication of successful registration of the UE for both third generation partnership project (3GPP) access and non-3GPP access.

Example 7a includes the apparatus of example 7 or some other example herein, wherein the registration accept message includes an indication that the second 5G-GUTI shall also be used over the first access.

Example 7b includes the apparatus of example 7 or some other example herein, wherein in the absence of an indication, the UE keeps the first 5G-GUTI for use over the first access.

Example 8 includes one or more computer-readable media storing instructions that, when executed by one or more processors, cause a fifth-generation core (5GC) network to: receive, from a user equipment (UE), a registration request message that includes a first fifth-generation globally unique temporary identifier (5G-GUTI) for the UE; allocate a second 5G-GUTI that the UE is to use to access a second public land mobile network (PLMN); and encode a registration accept message for transmission to the UE, the registration accept message including the second 5G-GUTI.

Example 9 includes the one or more computer-readable media of example 8 or some other example herein, wherein the instructions are further to identify a change between a first access mobility function (AMF) associated with the UE to a second AMF associated with the UE.

Example 10 includes the one or more computer-readable media of example 9 or some other example herein, wherein the instructions are further to: identify an indication from the first AMF of an existing next generation application protocol (NGAP) association for the UE towards a non-3GPP inter-working function (N3IWF); identify N2 connectivity towards the N3IWF for the second AMF; and create an NGAP UE association towards the N3IWF for the second AMF.

Example 11 includes the one or more computer-readable media of example 8 or some other example herein, wherein the first 5G-GUTI is a native 5G-GUTI assigned by the second PLMN or a PLMN that is equivalent to the second PLMN.

Example 12 includes the one or more computer-readable media of example 8 or some other example herein, wherein the first 5G-GUTI is a native 5G-GUTI assigned by a PLMN that is not the second PLMN or equivalent to the second PLMN.

Example 13 includes the one or more computer-readable media of example 8 or some other example herein, wherein the registration accept message includes an indication of successful registration of the UE for both third generation partnership project (3GPP) access and non-3GPP access.

Example 14 includes one or more computer-readable media storing instructions that, when executed by one or more processors, cause a user equipment (UE) to: generate a first message that includes a first fifth-generation globally unique temporary identifier (5G-GUTI) assigned by a public land mobile network (PLMN) for the UE; and encode the first message for transmission to a fifth-generation core (5GC) network of a second PLMN; receive a second message that includes a second 5G-GUTI; and access the second public land mobile network (PLMN) using the second 5G-GUTI.

Example 15 includes the one or more computer-readable media of example 14 or some other example herein, wherein the first 5G-GUTI is a native 5G-GUTI assigned by the second PLMN.

Example 16 includes the one or more computer-readable media of example 14 or some other example herein, wherein the first 5G-GUTI is a native 5G-GUTI assigned by a PLMN that is equivalent to the second PLMN.

Example 17 includes the one or more computer-readable media of example 14 or some other example herein, wherein the first 5G-GUTI is a native 5G-GUTI assigned by a PLMN that is not the second PLMN or equivalent to the second PLMN.

Example 18 includes the one or more computer-readable media of example 14 or some other example herein, wherein the first message is to register for access to the second PLMN while already connected to a first PLMN.

Example 19 includes the one or more computer-readable media of example 18 or some other example herein, wherein the instructions are to access the second PLMN using the second 5G-GUTI and access the first PLMN using the first 5G-GUTI.

Example 20 includes the one or more computer-readable media of example 14 or some other example herein, wherein the second message includes an indication of successful registration of the UE for both third generation partnership project (3GPP) access and non-3GPP access.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. A user equipment (UE), comprising:
   memory to store a first fifth-generation globally unique temporary identifier (5G-GUTI) assigned by a first public land mobile network (PLMN) for the UE; and
   processing circuitry, coupled with the memory, configured to:
      retrieve the first 5G-GUTI from the memory;
      generate a registration request message that includes the first 5G-GUTI;
      encode the registration request message for transmission to a fifth-generation core (5GC) network of a second PLMN;
      receive a registration accept message that includes a second 5G-GUTI and an indication that the second 5G-GUTI is to be used to access the first PLMN and the second PLMN in response to the UE being registered in the first PLMN and connectivity being established with an access node of the first PLMN; and
      access the first PLMN or the second PLMN using the second 5G-GUTI.

2. The UE of claim 1, wherein the first 5G-GUTI comprises a native 5G-GUTI assigned by the second PLMN.

3. The UE of claim 1, wherein the first 5G-GUTI comprises a native 5G-GUTI assigned by a third PLMN that is equivalent to the second PLMN.

4. The UE of claim 1, wherein the first 5G-GUTI comprises a native 5G-GUTI assigned by a third PLMN that is not the second PLMN nor equivalent to the second PLMN.

5. The UE of claim 1, wherein the registration request message is configured to register for access to the second PLMN while being connected to the first PLMN.

6. The UE of claim 1, wherein the registration accept message further includes another indication of successful registration of the UE for third generation partnership project (3GPP) access and non-3GPP access.

7. The UE of claim 1, wherein the registration accept message further includes a registration area for the UE.

8. One or more non-transitory computer-readable media storing instructions that, when executed by one or more processors, cause a fifth-generation core (5GC) network to:
   receive, from a user equipment (UE), a registration request message that includes a first fifth-generation globally unique temporary identifier (5G-GUTI) for the UE;
   allocate a second 5G-GUTI that is to be used by the UE to access a first public land mobile network (PLMN); and
   encode a registration accept message for transmission to the UE, the registration accept message including the second 5G-GUTI and an indication that the second 5G-GUTI is to be used to access the first PLMN and a second PLMN in response to the UE being registered in the first PLMN and connectivity being established with an access node of the first PLMN.

9. The one or more non-transitory computer-readable media of claim 8, wherein the instructions further cause the 5GC network to identify a change between a first access mobility function (AMF) associated with the UE to a second AMF associated with the UE.

10. The one or more non-transitory computer-readable media of claim 9, wherein the instructions further cause the 5GC network to:
    identify an indication from the first AMF of an existing next generation application protocol (NGAP) association for the UE towards a non-3GPP interworking function (N3IWF);
    identify N2 connectivity towards the N3IWF for the second AMF; and
    create an NGAP UE association towards the N3IWF for the second AMF.

11. The one or more non-transitory computer-readable media of claim 8, wherein the first 5G-GUTI comprises a native 5G-GUTI assigned by the first PLMN or a second PLMN that is equivalent to the first PLMN.

12. The one or more non-transitory computer-readable media of claim 8, wherein the first 5G-GUTI comprises a native 5G-GUTI assigned by a second PLMN that is not the first PLMN nor equivalent to the first PLMN.

13. The one or more non-transitory computer-readable media of claim 8, wherein the registration accept message further includes another indication of successful registration of the UE for third generation partnership project (3 GPP) access and non-3GPP access.

14. One or more non-transitory computer-readable media storing instructions that, when executed by one or more processors, cause a user equipment (UE) to:
   generate a first message that includes a first fifth-generation globally unique temporary identifier (5G-GUTI) assigned by a first public land mobile network (PLMN) for the UE;
   encode the first message for transmission to a fifth-generation core (5GC) network of a second PLMN;
   receive a second message that includes a second 5G-GUTI and an indication that the second 5G-GUTI is to be used to access the first PLMN and the second PLMN in response to the UE being registered in the first PLMN and connectivity being established with an access node of the first PLMN; and
   access the first PLMN or the second PLMN using the second 5G-GUTI.

15. The one or more non-transitory computer-readable media of claim 14, wherein the first 5G-GUTI comprises a native 5G-GUTI assigned by the second PLMN.

16. The one or more non-transitory computer-readable media of claim 14, wherein the first 5G-GUTI comprises a native 5G-GUTI assigned by a third PLMN that is equivalent to the second PLMN.

17. The one or more non-transitory computer-readable media of claim 14, wherein the first 5G-GUTI comprises a native 5G-GUTI assigned by a third PLMN that is not the second PLMN nor equivalent to the second PLMN.

18. The one or more non-transitory computer-readable media of claim 14, wherein the first message is configured to register for access to the second PLMN while being connected to the first PLMN.

19. The one or more non-transitory computer-readable media of claim 14, wherein the indication comprises another indication of successful registration of the UE for third generation partnership project (3GPP) access and non-3GPP access.

20. The one or more non-transitory computer-readable media of claim 14, wherein the second message further includes a registration area for the UE.

* * * * *